United States Patent
Criel et al.

(10) Patent No.: US 9,440,403 B2
(45) Date of Patent: Sep. 13, 2016

(54) METHOD FOR MANUFACTURING A PLASTIC FUEL TANK WITH IMPROVED CREEP STRENGTH

(71) Applicant: Inergy Automotive Systems Research (Societe Anonyme), Brussels (BE)

(72) Inventors: Bjorn Criel, Merelbeke (BE); Stephane Leonard, Brussels (BE); Thierry Ferracin, Sint-Stevens-Woluwe (BE); Frederic Jannot, Bousval (BE)

(73) Assignee: INERGY AUTOMOTIVE SYSTEMS RESEARCH (Société Anonyme), Brussels (BE)

( * ) Notice: Subject to any disclaimer, the term of this patent is extended or adjusted under 35 U.S.C. 154(b) by 144 days.

(21) Appl. No.: 14/042,144

(22) Filed: Sep. 30, 2013

(65) Prior Publication Data

US 2014/0027959 A1 Jan. 30, 2014

Related U.S. Application Data

(63) Continuation of application No. 11/721,785, filed as application No. PCT/EP2005/056750 on Dec. 13, 2005, now abandoned.

(30) Foreign Application Priority Data

Dec. 15, 2004 (FR) ..................................... 04 13310

(51) Int. Cl.
*B29C 49/20* (2006.01)
*B29D 22/00* (2006.01)
(Continued)

(52) U.S. Cl.
CPC ........... *B29D 22/003* (2013.01); *B29C 31/008* (2013.01); *B29C 49/20* (2013.01);
(Continued)

(58) Field of Classification Search
CPC .................. B29C 49/20; B29C 49/64; B29C 2049/2008; B29C 2049/2034; B29C 65/606; B29C 66/532; B29C 66/8322; B29C 51/12; B29C 51/267; B29D 22/003

USPC ...... 220/562, 678, 4.13, 4.14; 264/265, 511, 264/512, 516, 550, 545, 571, 523, 531, 249, 264/259; 425/528

See application file for complete search history.

(56) References Cited

U.S. PATENT DOCUMENTS 3,919,373 A 11/1975 Kormendi
3,952,880 A 4/1976 Hill et al.
(Continued)

FOREIGN PATENT DOCUMENTS

DE 17 80 682 2/1977
DE 692 08 616 7/1996
(Continued)

OTHER PUBLICATIONS

Office Action issued Feb. 3, 2014 in Japanese Patent Application No. 2012-065726 with English language translation.
(Continued)

*Primary Examiner* — Alison Hindenlang
*Assistant Examiner* — Lawrence D Hohenbrink, Jr.
(74) *Attorney, Agent, or Firm* — Oblon, McClelland, Maier & Neustadt, L.L.P

(57) ABSTRACT

A method for manufacturing a plastic fuel tank including: a) inserting a plastic parison including two distinct parts into an open two-cavity mold; b) inserting a core, bearing at least part of a reinforcing element configured to create a link between the two parison parts, inside the parison; c) pressing the parison firmly against the mold cavities, for example by blowing through the core and/or creating suction behind the cavities; d) fixing the part of the reinforcing element to at least one of the parison parts using the core; e) withdrawing the core; f) closing the mold, bringing its two cavities together to grip the two parison parts around their periphery to weld them together; g) injecting a pressurized fluid into the mold and/or creating a vacuum behind the mold cavities to press the parison firmly against the mold cavities; and h) opening the mold and extracting the tank.

7 Claims, 1 Drawing Sheet

(51) Int. Cl.
*B29C 49/64* (2006.01)
*B29C 51/12* (2006.01)
*B29C 51/26* (2006.01)
*B29C 31/00* (2006.01)
*B29C 65/02* (2006.01)
B29C 65/00 (2006.01)
B29C 49/04 (2006.01)
B29C 49/42 (2006.01)
B29C 65/60 (2006.01)
B29C 49/00 (2006.01)
B29K 23/00 (2006.01)
B29L 31/00 (2006.01)
B60K 15/03 (2006.01)
B29C 49/78 (2006.01)
B29C 51/46 (2006.01)

(52) U.S. Cl.
CPC .............. *B29C 49/64* (2013.01); *B29C 51/12* (2013.01); *B29C 51/267* (2013.01); *B29C 65/028* (2013.01); *B29C 66/53245* (2013.01); *B29C 66/90* (2013.01); *B29B 2911/14326* (2013.01); *B29C 49/04* (2013.01); *B29C 49/4273* (2013.01); *B29C 49/78* (2013.01); *B29C 51/46* (2013.01); *B29C 65/60* (2013.01); *B29C 66/532* (2013.01); *B29C 66/61* (2013.01); *B29C 66/8322* (2013.01); *B29C 2049/0057* (2013.01); *B29C 2049/206* (2013.01); *B29C 2049/2008* (2013.01); *B29C 2049/2013* (2013.01); *B29C 2049/2073* (2013.01); *B29C 2049/2078* (2013.01); *B29C 2049/2086* (2013.01); *B29C 2049/2095* (2013.01); *B29C 2791/001* (2013.01); *B29C 2791/006* (2013.01); *B29C 2791/007* (2013.01); *B29C 2793/0081* (2013.01); *B29C 2949/78025* (2013.01); *B29C 2949/7842* (2013.01); *B29C 2949/78151* (2013.01); *B29C 2949/78277* (2013.01); *B29C 2949/78294* (2013.01); *B29C 2949/78512* (2013.01); *B29C 2949/78663* (2013.01); *B29C 2949/78857* (2013.01); *B29C 2949/78873* (2013.01); *B29K 2023/065* (2013.01); *B29K 2023/086* (2013.01); *B29L 2031/7172* (2013.01); *B60K 15/03177* (2013.01)

(56) References Cited

U.S. PATENT DOCUMENTS

| | | | |
|---|---|---|---|
| 4,416,461 A | 11/1983 | Hayashi et al. | |
| 4,891,000 A | 1/1990 | Ishii | |
| 5,221,021 A | 6/1993 | Danna | |
| 5,243,933 A | 9/1993 | Mukawa | |
| 5,308,427 A * | 5/1994 | Duhaime | B29C 65/028 156/515 |
| 5,466,413 A | 11/1995 | Richter et al. | |
| 6,135,306 A * | 10/2000 | Clayton | B60K 15/03177 220/501 |
| 6,138,859 A | 10/2000 | Aulph et al. | |
| 6,338,420 B1 * | 1/2002 | Pachciarz | B60K 15/03177 220/4.13 |
| 6,435,557 B1 | 8/2002 | Palvoelgyi | |
| 6,712,234 B2 * | 3/2004 | Boecker | F02M 37/103 220/4.13 |
| 6,719,163 B1 | 4/2004 | Delbarre et al. | |
| 6,726,967 B2 | 4/2004 | Vorenkamp et al. | |
| 6,814,921 B1 | 11/2004 | Van Schaftingen et al. | |
| 6,857,534 B1 * | 2/2005 | Keller | B29C 65/20 220/4.13 |
| 7,204,520 B2 | 4/2007 | Mueller et al. | |
| 8,372,331 B2 | 2/2013 | Jannot et al. | |
| 8,591,798 B2 * | 11/2013 | Criel | B29C 66/81431 220/4.14 |
| 2001/0015513 A1 * | 8/2001 | Schaftingen | B29C 49/0047 264/515 |
| 2002/0100759 A1 | 8/2002 | Schmidt et al. | |
| 2002/0125254 A1 | 9/2002 | Hagano et al. | |
| 2003/0102033 A1 | 6/2003 | Dasilva et al. | |
| 2003/0157459 A1 * | 8/2003 | Augthun | A61C 8/005 433/173 |
| 2004/0129708 A1 | 7/2004 | Borchert et al. | |
| 2005/0284871 A1 | 12/2005 | Leonard et al. | |
| 2007/0062841 A1 * | 3/2007 | Nakamura | B60K 15/03177 206/562 |
| 2009/0250846 A1 | 10/2009 | Criel et al. | |
| 2012/0006476 A1 | 1/2012 | Criel et al. | |

FOREIGN PATENT DOCUMENTS

| | | | |
|---|---|---|---|
| DE | 102 31 866 A1 | 1/2004 | |
| DE | WO 2004007182 A1 * | 1/2004 | ............ B26D 3/001 |
| EP | 0 180 226 A1 | 5/1986 | |
| EP | 0 466 275 | 1/1992 | |
| EP | 0 595 158 A1 | 5/1994 | |
| EP | 1 110 697 | 6/2001 | |
| EP | 1 216 811 | 6/2002 | |
| FR | 2 877 256 | 5/2006 | |
| GB | 1 410 215 | 10/1975 | |
| GB | 2 236 288 A | 4/1991 | |
| JP | 48-62858 | 9/1973 | |
| JP | 55 011823 | 1/1980 | |
| JP | 55 025380 | 2/1980 | |
| JP | 55 105539 | 8/1980 | |
| JP | 55-105539 A | 8/1980 | |
| JP | 56 028831 | 3/1981 | |
| JP | S61 114835 A | 6/1986 | |
| JP | 02 0171228 | 7/1990 | |
| JP | H04 91923 A | 3/1992 | |
| JP | 4-71320 U | 6/1992 | |
| JP | 2002 285928 | 10/2002 | |
| JP | 2004-505797 A | 2/2004 | |
| JP | 2004-505812 A | 2/2004 | |
| WO | WO 02/14041 A2 | 2/2002 | |
| WO | WO 2004/007182 | 1/2004 | |
| WO | WO 2004007182 A1 * | 1/2004 | |
| WO | WO 2004/052743 | 6/2004 | |
| WO | WO 2004/060709 A1 | 7/2004 | |
| WO | 2010/122065 | 10/2010 | |

OTHER PUBLICATIONS

U.S. Appl. No. 14/062,474, filed Oct. 24, 2013, Criel, et al.
Japanese Office Action Issued May 14, 2013 in Patent Application No. 2012-065726 (with English translation).
Office Action issued May 11, 2015 in Japanese Patent Application No. 2014-10174 (with English language translation).
International Search Report mailed Feb. 12, 2016 in European Application No. EP 15 17 3215.
Office Action (Notice of Opposition) dated Apr. 12, 2016 in European Patent Application No. 05821506.2.
Letter of the Opponent (Kierdorf Ritschel Richly) dated Apr. 4, 2016.

* cited by examiner

METHOD FOR MANUFACTURING A PLASTIC FUEL TANK WITH IMPROVED CREEP STRENGTH

CROSS-REFERENCE TO RELATED APPLICATIONS

This application is a Continuation application of U.S. application Ser. No. 11/721,785, filed Jun. 14, 2007, which is the National Stage of PCT/EP2005/056750, filed Dec. 13, 2005, and claims priority under 35 U.S.C. 119 to French Application No. 04.13310, filed Dec. 15, 2004. The entire content of U.S. application Ser. No. 11/721,785 is incorporated herein by reference.

BACKGROUND

The present invention relates to a method for manufacturing a plastic fuel tank with improved creep strength.

Plastic fuel tanks intended for motor vehicles have to meet specifications that specify maximum permissible amplitudes of deflection on their lower skin. The deflections stated in these specifications usually have to be met during ageing tests in which the tank contains a certain quantity of fuel for a given period of time (typically several weeks) and at temperature (usually 40° C.). The purpose of these specifications is to ensure that vehicles maintain their road clearance and to prevent the skin of the tank coming into contact with hotspots of the vehicle.

At the present time, plastic fuel tanks are generally fixed to the chassis of the vehicle via plastic lugs and are supported by metal straps. The latter are used in particular on the more capacious tanks where compliance with maximum permissible deflections is more difficult. However, recourse to these straps involves an additional attachment step and is therefore not very economical.

Solutions have been proposed in the prior art with a view to enhancing the mechanical strength (including the creep strength) of fuel tanks.

Thus, it has been proposed (particularly in U.S. Pat. Nos. 3,919,373 and 4,891,000) that an insert be secured inside the tank at the time of its blow-moulding from a cylindrical parison. However, it is not easy to position the insert accurately using this technique.

It has also been proposed (in US Application 2002/0100759) that the two walls of the tank be secured together directly by welding. However, this results in a loss of useful tank volume (as a result of the inflection of the said walls at the welding seam).

BRIEF SUMMARY

It is therefore an object of the invention to provide a method that is able to strengthen a fuel tank and, more specifically, increase its creep strength and to do so easily and reliably without any loss in useful volume.

To this end, the invention relates to a method for manufacturing a plastic fuel tank with improved creep strength, whereby:
a) a plastic parison comprising two distinct parts is inserted into an open two-cavity mould;
b) a core is inserted inside the parison, the said core bearing at least part of a reinforcing element capable of securing (creating a link between) the two parts of the parison;
c) the parison is pressed firmly against the mould cavities (by blowing through the core and/or creating suction behind the cavities);
d) (the part of) the reinforcing element is fixed to at least one of the parts of the parison using the core;
e) the core is withdrawn;
f) the mould is closed again, bringing its two cavities together in such a way as to grip the two parts of the parison around their periphery in order to weld them together;
g) a pressurized fluid is injected into the mould and/or a vacuum is created behind the mould cavities in order to press the parison firmly against the mould cavities;
h) the mould is opened and the tank is extracted.

DETAILED DESCRIPTION

Figure 1:
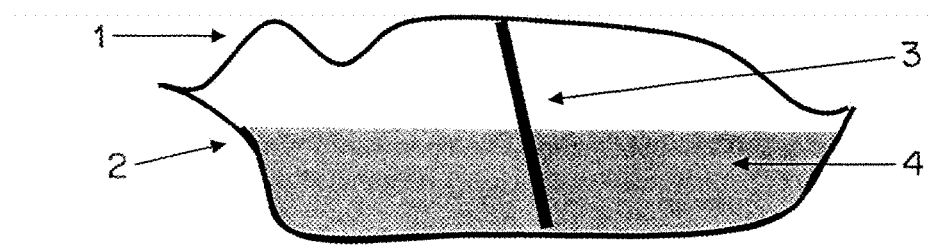
FIG. 1 is a view of a tank in accordance with an aspect of the present disclosure.

The term "fuel tank" is intended to denote a sealed tank able to store fuel under diverse and varying environmental and usage conditions. An example of this tank is a tank fitted to motor vehicles.

The fuel tank produced according to the method according to the invention is made of plastic, that is to say of a material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, nonlimitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, thermoplastic polyesters, polyketones, polyamides and copolymers thereof may be used. A blend of polymers or copolymers may also be used, as may a blend of polymer materials with inorganic, organic and/or natural fillers, such as, for example, but nonlimitingly, carbon, salts and other inorganic derivatives, natural fibres or polymeric fibres. It is also possible to use multilayer structures consisting of stacked layers bonded together comprising at least one of the polymers or copolymers described above.

One polymer which is often used is polyethylene. Excellent results have been obtained with high density polyethylene (HDPE). As a preference, the tank also comprises a layer of a resin impermeable to the fuel, such as EVOH, for example (a copolymer of ethylene and partially hydrolysed vinyl acetate). Alternatively, it may be subjected to a surface treatment (fluoration or sulphonation) the purpose of which is to render it impermeable to the fuel.

According to the invention, the parison is introduced into a mould comprising at least two cavities (external parts) and one core (internal part). This mould is generally based on metal, and, as a preference, based on separate and assembled metal blocks.

In the method according to the invention, the core allows at least part of a reinforcing element intended to secure (create a link between) the two parts of the parison (the future upper and lower walls of the tank) to be fixed. For convenience and in order to shorten the terms used, the term "reinforcing element" will be used hereinafter, it being understood that this may be just part of such an element. This reinforcing element is preferably substantially rigid, i.e. not very deformable.

The method according to the invention therefore uses a core. That means a part of a size and a shape suitable for insertion between the mould cavities. Such a part is described, for example in Patent GB 1,410,215, the content of which for this purpose is incorporated by reference into the present application. The core may be equipped with heating parts (mirrors for example) enabling a part of the accessory that is to be welded (which is generally preheated, for example by infrared heating, beside the core) to be kept hot. It may also be equipped with heating parts (for example filaments) in the region or regions to be in contact with the parison during placement of the reinforcing elements (see later).

The core may also serve to lower pressurized gas into the mould in order to press the parison firmly against the mould cavities.

Finally, the core may also be used to at least partially effect process control. To do this, it is possible, for example to incorporate a camera into the mould in order to watch and monitor the quality of the fixing of the reinforcing elements (and any other accessories there might be) through image analysis. One or more sensor(s) for measuring (a) parameter(s) such as the force, the travel, the pressure and the temperature may also be installed on the core in order to better monitor the attachment of the elements to the parison.

According to the invention, the parison (or molten or softened plastic component ready for moulding) is made up of at least two separate parts which preferably have a similar structure. What this means is that they comprise a number of layers that do not differ from one another by more than 3 units and, for preference do not differ by more than 2 units and that the nature of the polymers involved in the layers that correspond to one another is compatible from a chemical viewpoint and from the point of view of its ability to be assembled by welding. Structures having the same number of layers and, in particular, identical structures, are preferred. These two separate parison parts are intended to form the upper wall and the lower wall of the tank respectively.

In the method according to the invention, the tank is moulded in a single piece (in a single step after which a one-piece tank is obtained without having to resort to an additional step of assembling separate shells) from a parison made in at least two parts, this generally being achieved by welding the two parison parts together as the mould is closed. In particular, advantageously the tank is moulded by:
   blowing, i.e. expanding and firmly pressing a tubular parison comprising at least one cut-out against the walls of a mould using a pressurized fluid (as described in EP Application 1110697, the content of which is incorporated for this purpose by reference into the current application);
   thermoforming sheets, i.e. pressing these firmly against the walls of a mould for example by sucking (creating a vacuum) behind them.

In the method according to the invention, the actual shaping of the parison (i.e. deforming it so that it substantially acquires the shape of the tank) chiefly occurs during step c). During step f) (during which the aforementioned welded seam is made) the pressure (or suction) is simply maintained in order to maintain the dimensional stability of the tank.

In the case of a blow-moulded tank (blown using a pressurized fluid injected into the mould), as a preference the parison consists of two separate parts resulting from the patterning of one and the same extruded cylindrical parison as described in EP Application 1110697 in the name of the Applicant company and the content of which for this purpose is incorporated by reference into the current application. According to this variant, having extruded a single parison, the latter is cut along its entire length along two diametrically opposed lines to obtain two separate parts (sheets). By comparison with the blow-moulding of two separately extruded sheets, the thickness of which is constant, this approach makes it possible to use parisons of varying thickness (that is to say of a thickness that is not constant along their length) obtained by an appropriate extrusion device (generally an extruder equipped with a die, the position of the punch of which can be adjusted). Such a parison takes account of the reduction in thickness that occurs during blow-moulding at certain points on the parison as a result of non-constant rates of deformation of the material in the mould.

Alternatively, the tank may be moulded by thermoforming two sheets (or by creating a vacuum behind the mould cavities). Such a method generally leads to little or no non-uniform reductions in thickness and can therefore cope with a parison of constant thickness (extruded sheets, for example).

As a preference, the tank is blow-moulded. This is because thermoforming generally entails heating the moulds to 60° C. so that the deep deformations (the corners of the tank, for example) can be achieved. This results in longer cycle times than are needed with blow-moulding where this constraint does not exist.

To do this, the mould cavities are generally closed on to the core—i.e. are brought into contact with it and delimit a sealed region on either side of the core—during steps c) and d). More precisely, since these cavities bear the parison, the core is in contact with the parison which is therefore sandwiched between the core and the mould cavities. This then is a kind of first closing of the mould, with the core interposed between and in contact with the cavities, and in which pressurized gas (generally air) is blown in.

In this case, the method according to the invention also comprises a degassing step which is performed before each opening of the mould. The degassing step may be done in any appropriate way. Generally, the parison is first of all punctured (for example by pricking it with a needle) and then the fluid is discharged from the mould (for example using a valve).

When the tank is moulded by thermoforming, there is no need for the mould to be closed onto the core in order to press it firmly onto the cavities (because this is done by suction under these cavities rather than by blowing via the core). In this case, all that is required is for the cavities to be positioned around (in the broadest sense: in the vicinity of) the core.

During the method according to the invention, there is preferably a device to prevent the edges of the parts of the parison from becoming welded together during the first closure of the mould onto the core, if necessary. This device is advantageously incorporated into the core. For this purpose, the core preferably has a size and a shape that are appropriate for its being partly (generally over at least part of its periphery) inserted between the two parts of parison that are to be welded together.

To facilitate the welding during step f), the mould cavities are advantageously provided with a thermal regulating device allowing the welding region to be heated during the steps involved in the first closure of the mould, if necessary. As a quite particular preference, the core also has such a device (a thermal regulating device) in its region(s) of contact with the parison, and this particularly when the latter comprises the aforementioned welding region. This variant could further improve the quality of the welded seam of the tank (by reducing the internal bead and therefore improving the impact strength of the tank). Such a setup is described, for example in application FR 04.13407 in the name of the Applicant company, the content of which for this purpose is incorporated by reference into the current application.

According to the invention, the core is equipped with the said reinforcing element before it is introduced into the parison which is itself placed in the mould. To attach the element to the parison, the core advantageously comprises a hydraulic ram capable of moving the element that is to be attached and of exerting pressure thereon.

As mentioned previously, the reinforcing element may be attached to the parison in any known way. It may be done by welding the said element directly to the parison (when the material of which it is made in the fixing region is compatible with that of the tank), by staking (as described in Patent FR 04.11550 in the name of the Applicant company and the content of which for this purpose is incorporated by reference into the current application), by clip-fastening/screw-fastening (in which case the core first of all fixes a clip or an element equipped with a screw thread onto the parison and then clips/screws the reinforcing element onto this), etc. One advantage of the method according to the invention is therefore that it is able to cope with various methods of attachment (welding, staking, clip-fastening, etc.) and therefore, also allows the choice of any possible material for the reinforcing element.

The expression "reinforcing element" is intended to denote any object (bar, rod, cable, baffle, unit, etc. which, once the tank has been moulded, connects its lower (the one mounted facing downwards in the vehicle and which is likely to creep under the weight of the fuel) and upper (the one mounted facing upwards and subject to little or no creep during use) walls of the tank together.

This may be an element used expressly for this purpose (a rod, a cable, etc.) or any functional device or object generally associated with the fuel tank in its customary method of use or operation and which is voluminous enough to extend from one wall to the other.

An example of such a structure which is particularly suitable is the tank pump/gauge module.

In this variant (functional element as reinforcing element) it is advantageous that, during the method according to the invention, only the support of the functional element in question be placed on the core (and therefore on the parison). This is because since tanks that do not meet the standards are ground up, it is not very economical to also have to grind up functional elements which are often expensive. In this case, therefore, the method according to the invention allows the support of the functional element which will be introduced later into the tank through an opening made therein, and then fixed to the support on the one hand and to the opening in the tank on the other hand (for example using a threaded ring) to be fixed (by clip-fastening onto a pre-moulded shape (clip) on the wall of the tank by welding, staking, etc.) using the core. Such an approach is particularly suitable for a pump/gauge module by way of functional element.

Alternatively, the reinforcing element may consist of a part specially used for this purpose and therefore small in size, such as a bar, a rod, a cable, etc., that will be denoted hereinafter under the general term (rod). This is generally an element of substantially elongate shape and substantially constant cross section, preferably round.

Recourse to HDPE rods is particularly advantageous when the tank is also based on HDPE because then the said rods can be made using tank production waste (scraps) which can therefore be put to economical use. More generally, therefore, in this variant, it is advantageous for the rods to be made from waste from the production of similar tanks.

In the case of rods, their number and mechanical strength will be tailored to suit the desired result. For example, they may be assembled to form a network (where, for example, the rods alternately connect the lower and upper walls and define triangular shapes at the nodes). A material compatible with that of the tank so that they can be fixed directly by welding to the parison will advantageously be chosen by way of a material from which to make these rods. According to this aspect therefore recourse to scraps is particularly suitable also.

In the case of the "rods" as defined hereinabove, one practical way of fixing them in the context of the invention is to split them into two, to equip them with a clip and to fix the parts, not clip-fastened together, one on each side, on a part of the parison each, using the core, but without clip-fastening them. In this case, either the shrinkage of the tank after release from the mould is enough for the two parts to clip-fasten of their own accord or alternatively, external pressure is applied (manually or via a machine) to the walls of the tank in order to perform/enhance the clip-fastening.

Alternatively, when the rod is made as a single piece, it is preferably fixed to one of the parts of the parison during step d) and fixed to the other part during step f). This variant is, however, less advantageous because the post-moulding shrinkage is liable to introduce tension to the points of attachment of the rods to the tank. In the case of a welded attachment, the core is then advantageously equipped with a ram comprising a heating element (mirror, filament etc.) to keep the second end (the one secured second) of the reinforcing element hot while the 1st is being welded.

The reinforcing element that is to connect the walls of the tank is generally mounted substantially perpendicular to the walls of the tank when there is just one of them. When recourse is had to several reinforcing elements (several rods, for example) these may be inclined. The person skilled in the art on the basis of calculation (simulation) of mechanical strength, will seek to optimise the mounting (point of attachment; orientation) of the reinforcing element(s) according to the desired result.

He will preferably also ensure that there is little (or preferably no) inflection in the walls at the points of attachment of the reinforcing element so as not to adversely affect the free volume of the tank and so as not to create unnecessary dead spots and/or stress raisers. From this point of view, therefore, two-part reinforcing elements assembled in situ after shrinkage (such as the rods mentioned earlier) give better results.

Generally, fuel tanks are fixed to the chassis of vehicles by straps, generally metal ones. These straps also have the advantage of enhancing the creep strength of the tank, but they also have the disadvantage of a relatively high cost. As a result, there is a desire to replace them with other devices such as fixing lugs present around the periphery of the tank. However, these tanks have then to be equipped with additional reinforcing elements, and the object of the present invention is particularly suited to this context. Specifically, this method with a parison made in two parts welded together generally leads to a welded seam in which the excess material or sprue is generally removed during the so-called trimming operation. All that is then required, during this operation, is to leave some portions or pads which can act as tank fixing lugs. As a result, in a preferred variant of the invention, the welding in step f) generates a welded seam which is partially removed during step i) so as to leave pads or lugs for attaching the tank to a motor vehicle chassis.

The present invention also relates to plastic fuel tanks that can be obtained using the method according to the invention.

According to one aspect, it relates to a plastic fuel tank comprising a lower wall and an upper wall which are assembled by welding, and at least one rod situated inside the tank and connecting its lower wall to its upper wall.

As a preference, this rod is made in two parts (preferably of substantially equal lengths) each having two ends of which one is fixed (preferably by welding) to one of the walls of the tank and the other is clipped to the other part of the rod.

According to another aspect, the present invention relates to a plastic fuel tank comprising a lower wall and an upper wall which are assembled by welding, and at least one functional element situated inside the tank and connecting its lower wall to its upper wall. This functional element is as described hereinabove in the context of the method according to the invention.

Finally, according to a last aspect, the invention relates to a plastic fuel tank comprising a lower wall and an upper wall assembled by welding, and at least one reinforcing element situated inside the tank and connecting its lower wall to its upper wall, the welding connecting the walls being extended by a welded seam that is interrupted in places to form lugs so that the tank can be fixed to a motor vehicle chassis in particular.

Figure 2:
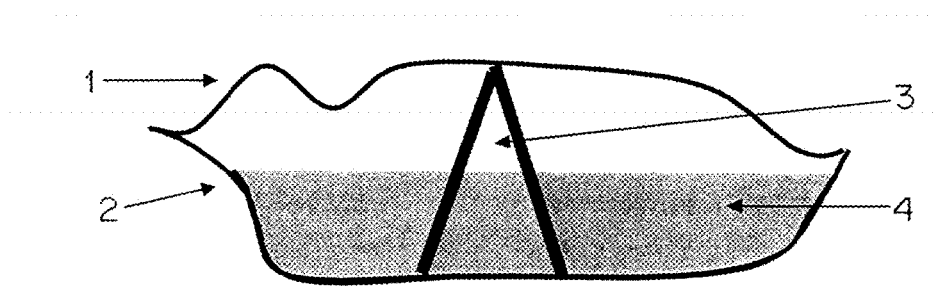
FIG. 2 is a view of a tank in accordance with an aspect of the present disclosure.

The purpose of FIGS. 1 and 2 is to illustrate certain concrete aspects of the invention without in any way wishing to restrict its scope.

They each depict a section (on a plane perpendicular to the surface of the tank at this point) through a tank to which one or more rods have been fixed. These rods are made of a plastic that has a certain rigidity in tension.

In FIG. 1, a single rod (3) connects a point of the upper wall (1) of the tank to a point of the lower wall (2) of a tank which contains fuel (4). This rod (3) has been fixed at these two points by welding (firstly, on one side of the parison using the core and then, on the other side, as the mould is closed). Its overall orientation is vertical without necessarily being perfectly aligned with the vertical. As a result of this rod (3) the deflection of the lower wall (2) is limited because it is constrained at least in part by the upper part (1).

In FIG. 2, two rods (3) have been fixed in such a way as to define a triangular ridge. They have first of all been stake-fastened at one end (to part of the parison) in such a way as to depict a "V". Next, they have been welded at two points to the other part of the parison upon mould closure.

The invention claimed is:

1. A method for manufacturing a plastic fuel tank, comprising:
    a) inserting a plastic parison including two distinct parts into an open two-cavity mold;
    b) inserting a core inside the parison, the core bearing at least part of a reinforcing element configured to create a link between the two parts of the parison;
    c) closing the mold and pressing the parison firmly against the mold cavities, or blowing through the core and/or creating suction behind the cavities;
    d) fixing at least a part of the reinforcing element to at least one of the parts of the parison using the core while the mold is closed;
    e) opening the mold and withdrawing the core;
    f) closing the mold again, bringing its two cavities together so as to grip the two parts of the parison around their periphery to weld them together;
    g) injecting a pressurized fluid into the mold and/or creating a vacuum behind the mold cavities to press the parison firmly against the mold cavities; and
    h) opening the mold and extracting the tank
    wherein the reinforcing element includes at least one rod,
    wherein the at least one rod is made in two parts equipped with a clip-fastening device,
    wherein the parts, not clip-fastened to one another, are fixed facing one another on a part of the parison each, and
    wherein external pressure is applied to the walls of the tank to perform or enhance the clip-fastening.

2. The method according to claim 1, wherein the tank is molded by injecting a pressurized fluid into the mold.

3. The method according to claim 1, wherein the tank is molded by creating a vacuum behind the mold cavities, and wherein the parison is made of two extruded sheets.

4. The method according to claim 1, wherein the welding in step f) generates a welded seam that is partially removed so as to leave pads or lugs for attaching the tank to a motor vehicle chassis.

5. The method according to claim 1, wherein the at least one rod is made from waste from the production of similar tanks.

6. The method according to claim 1, wherein the core includes a ram that fixes the reinforcing element to the parison.

7. A method for manufacturing a plastic fuel tank, comprising:
    a) inserting a plastic parison including two distinct parts into an open two-cavity mold;
    b) inserting a core inside the parison, the core bearing at least part of a reinforcing element configured to create a link between the two parts of the parison;
    c) closing the mold and pressing the parison firmly against the mold cavities, or blowing through the core and/or creating suction behind the cavities;
    d) fixing at least part of the reinforcing element to at least one of the parts of the parison using the core while the mold is closed;
    e) opening the mold and withdrawing the core;
    f) closing the mold again, bringing its two cavities together so as to grip the two parts of the parison around their periphery to weld them together;
    g) injecting a pressurized fluid into the mold and/or creating a vacuum behind the mold cavities to press the parison firmly against the mold cavities; and
    h) opening the mold and extracting the tank
    wherein the reinforcing element includes at least one rod,
    wherein the at least one rod is made in two parts equipped with a clip-fastening device,
    wherein the parts, not clip-fastened to one another, are fixed facing one another on a part of the parison each, wherein the parts are brought into contact at step f) without clip-fastening, and wherein shrinkage of the tank after release from the mold is enough for the two parts to clip fasten of their own accord or external pressure is applied to the walls of the tank to perform or enhance the clip-fastening.

\* \* \* \* \*